Oct. 13, 1942.         L. W. WACHTER              2,298,851
                          TRAILER
         Filed July 10, 1941           3 Sheets-Sheet 1
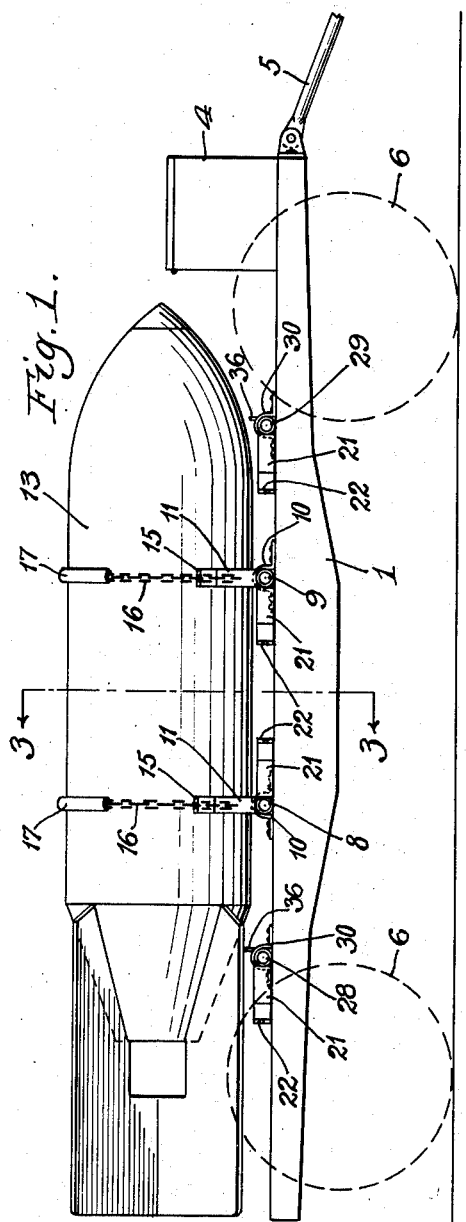
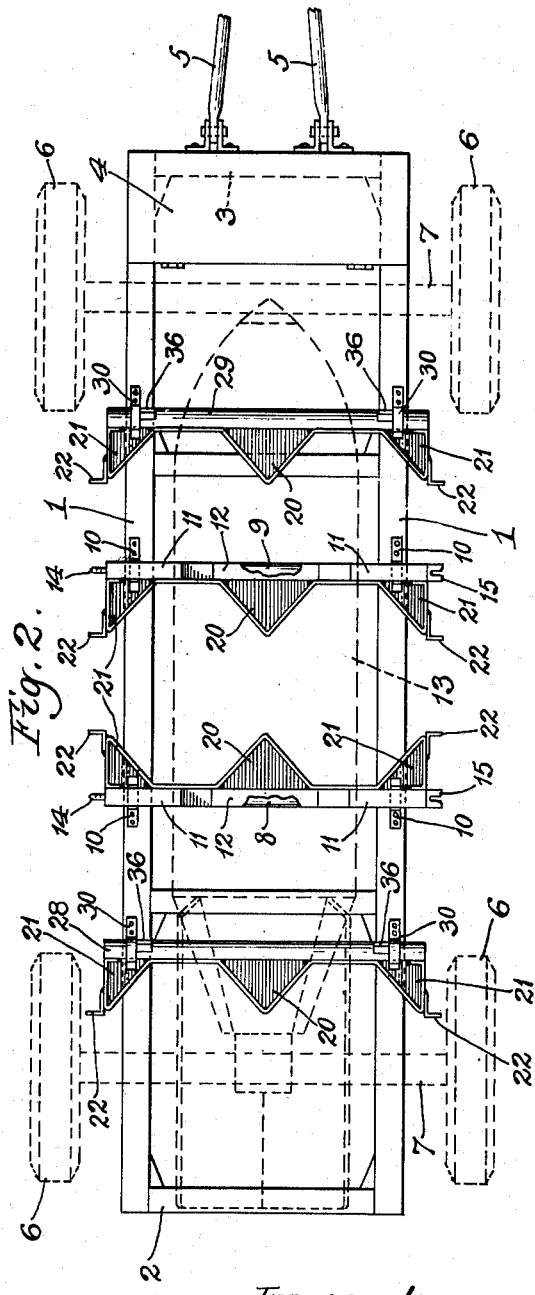
Inventor.
Lester W. Wachter
by Parker & Carter
Attorneys.

Oct. 13, 1942.  L. W. WACHTER  2,298,851
TRAILER
Filed July 10, 1941  3 Sheets-Sheet 2
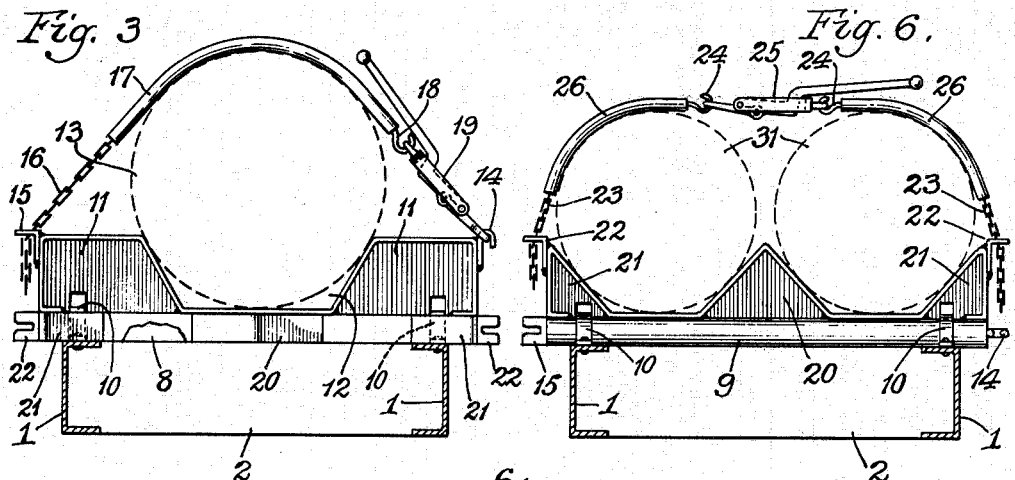
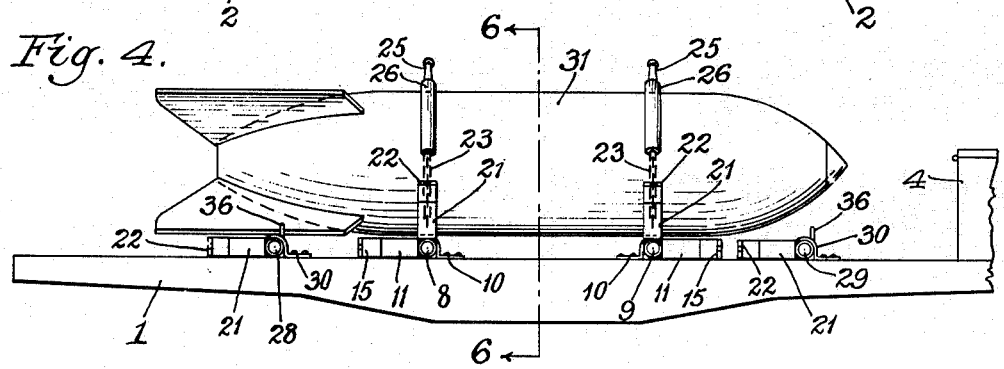
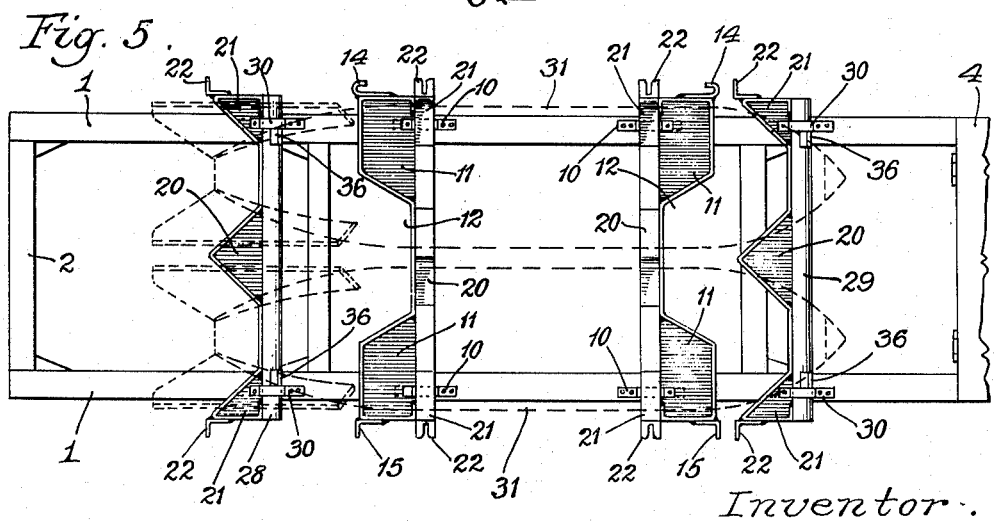
Inventor
Lester W. Wachter.
by Parker & Carter
Attorneys.

Oct. 13, 1942.          L. W. WACHTER          2,298,851
                            TRAILER
              Filed July 10, 1941        3 Sheets-Sheet 3
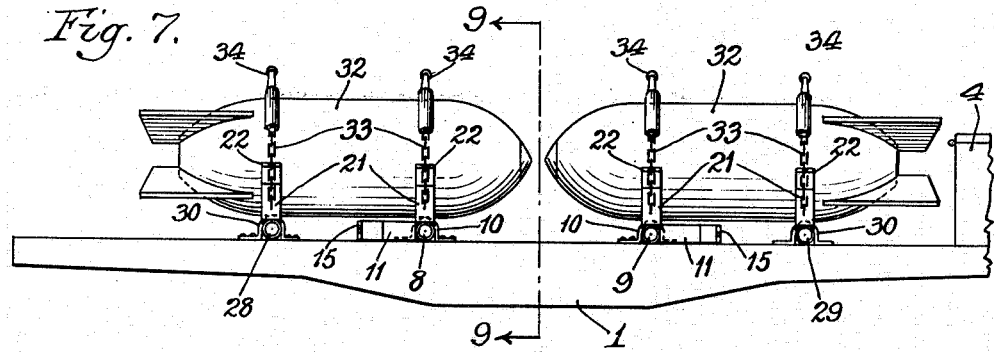
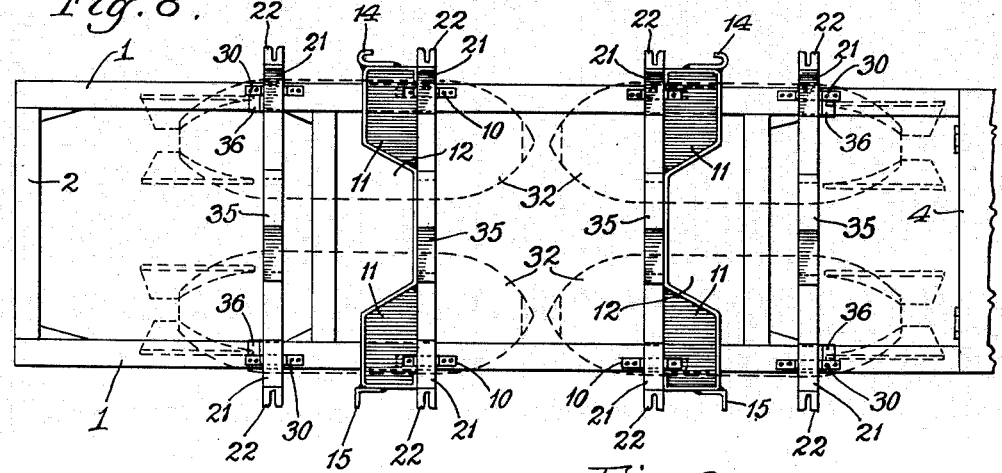
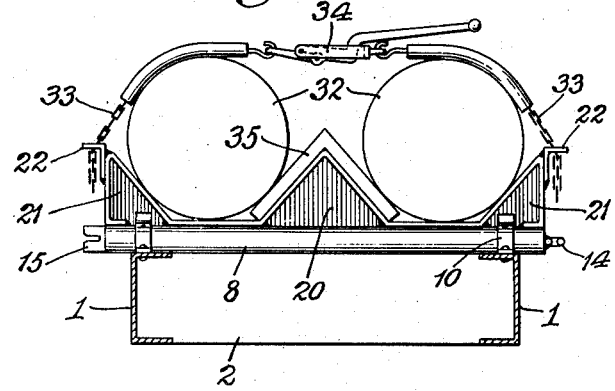
Inventor.
Lester W. Wachter.
by Parker & Carter
           Attorneys.

Patented Oct. 13, 1942

2,298,851

UNITED STATES PATENT OFFICE 2,298,851

TRAILER

Lester W. Wachter, Streator, Ill., assignor to Anthony Company, Streator, Ill., a corporation of Illinois Application July 10, 1941, Serial No. 401,723

8 Claims. (Cl. 280—179)

This invention relates to a load carrying device or assembly. In one form it may be embodied in a truck or trailer arranged for carrying one or more articles of different sizes. One object of the invention is to provide, in connection with an apparatus of the character indicated, means for holding securely articles of several different sizes.

Another object is to provide adjustable article holding means.

Another object is to provide in connection with a load carrying assembly a plurality of adjustably mounted load holding means so arranged that in any position of adjustment the load itself prevents maladjustment of the load holding parts.

Other objects are indicated from time to time in the specification and claims.

The invention is shown in the following figures, wherein—

Figure 1 is a side elevation of one form of the device.

Figure 2 is a plan view of the device of Figure 1, with the load member shown in dotted lines.

Figure 3 is a transverse vertical section taken at line 3—3 of Figure 1.

Figure 4 is a side elevation similar to Figure 1 but showing a different position of adjustment of the holding means and showing a smaller article in place.

Figure 5 is a plan view of the form of Figure 4 with smaller articles indicated in dotted lines.

Figure 6 is a transverse vertical section taken at line 6—6 of Figure 4.

Figure 7 is a view generally similar to Figures 1 and 4 showing a further position of adjustment of the load carrying parts and showing smaller members in place.

Figure 8 is a plan view of Figure 7 with the load members indicated in dotted lines.

Figure 9 is a transverse vertical section taken at line 9—9 of Figure 7. Like parts are designated by like characters throughout.

In the form shown in Figure 1, the invention may be embodied in a trailer of almost any suitable design. As shown, the trailer comprises a frame including longitudinal members 1 and transverse members 2 and 3. Upon the transverse member 3 may be mounted a box or seat 4 and some form of hitch member 5, 5 may be secured to the transverse member 3.

The invention is not limited to any particular hitch arrangement and the members 5 are shown merely as indicating that means may be provided for hitching the trailer to any desired means for pulling it. As shown in Figures 1 and 2, the frame is supported on wheels 6, 6 which may be carried on axles 7, 7 or otherwise.

The load holding or supporting parts in the form shown herewith comprise two central holding members. As shown, the central holding members comprise tubular parts 8 and 9. These members are mounted for limited rotation on the frame members 1 and are held in place by strap like bearing members 10, 10. The tubular member 8 has secured to it members 11, 11 between which is formed a depression 12. This arrangement is shown in Figure 3 and from that figure it is clear that the space or depression 12 is of suitable size to receive and to fit snugly with one of the large load members 13. In the form here shown, this member may be considered as a bomb. Upon one of the members 11 is mounted a hook 14 and upon the other is mounted a notched member 15. A chain 16 may be adjustably received in the notch of the member 15. This chain may have a cushioning member 17 mounted about it and at its other end terminates in a hook 18. A toggle assembly 19 engages the hook 18 and hook 14.

Secured to the tubular member 9 anad spaced 90° from the member 11 are a central member 20 and two lateral members 21. To each of the members 21 is secured a notched member 22. As shown in Figure 6, in particular, the member 22 may receive chains 23 which terminate in hooks 24 adapted to engage a toggle assembly 25. Guards or cushions 26, 26 may be positioned about each of the chains 23.

The tubular member 9 is mounted similarly to the member 8 and carries load spacing and contacting members identical with those described in connection with the tubular member 8. Their arrangement upon the member 9, however, differs, and, as shown in Figures 1 and 2 in particular, they are so arranged that when the members 11, mounted on the tubular members 8 and 9, extend upwardly, the members 20 and 21 of the rearward tubular member 8 extend forwardly, while the members 20 and 21 of the forward member 9 extend backwardly. This arrangement is important to prevent misadjustment and unsatisfactory operation of the parts.

In addition to the load carrying parts mounted on the tubular members 8 and 9 above described, there are two identical forward and rear load carrying members. Thus the tubular member 28 and the tubular member 29 are held in place by strap like members 30, 30 and each of them has mounted upon it a member 20 and a pair of members 21, 21 which correspond in size and shape to the members 20 and 21 which are mounted on the tubular parts 8 and 9 as above described. They carry also notched or slotted members 22 adapted to receive fastening chains, the members 29 and 30 may have stops 36 secured to them. These stops contact the frame members 1 when the parts are in the position shown in Figure 8, and so position the parts to receive and support the small loads 32.

Although I have shown an operative form of my invention, many changes might be made in the shape, arrangement, and disposition of parts without departing from the spirit of my invention. Thus there might be more than four load supporting assemblies and there might be load supporting members arranged to receive more than two bombs abreast. For some purposes, an adapter 35 may be used to fit over the central members 20, 20 or it may be omitted.

The use and operation of this invention are as follows:

When it is desired to carry a single large member whose weight approximates the safety load capacity of the trailer, the load carrying parts are adjusted to the position of Figures 1, 2, and 3. As there shown the members 11 are upward and the two central depressions 12 have received the large single load member or bomb 13. The chains 16 are adjusted in the two notched members 15. The toggles 19 are tightened and the single bomb is held in place.

When it is desired to carry two medium sized bombs instead of a single bomb the members 8 and 9 are rotated so that the parts 11 move to the position of Figures 4, 5, and 6 and lie flat upon the side frame members 1. This raises the members 20 and 21 to the position of Figure 6 and provides two depressions to receive medium sized bombs 31 and they are held in place by the pairs of chains 23 and the toggles 25.

It is important to notice that both in the adjustment of Figure 1 and Figure 4 the bomb holding members cannot rotate out of adjusted position. Thus considering Figure 1 member 8 cannot rotate clockwise because the parts 21 are in contact with the upper surface of the side frame members 1. Should the member 8 start to rotate counterclockwise it could go only a very short distance before the member 20 would contact the bottom of the load or bomb 13 and further rotation would be impossible. Similar conditions control the position of the forward member 9 and its associated bomb receiving parts. The result of this construction is, therefore, that the load itself prevents misadjustment once the load carrying parts have been adjusted and have received the load. In Figure 4 the position of adjustment is the opposite of that shown in Figure 1 and from that figure it is clear that should either of the members 8 or 9 start to rotate the rotation would be prevented by contact with the load or with the side frame members 1.

As shown in the last three figures, the end supporting members carried by the tubular parts 28 and 29 are used. As there shown all of the members 20 and 21 extend upwardly and each pair of these members carries a small bomb 32. These bombs are held in place by pairs of chains 33 which are adjustably received in the slotted members 22 and held against displacement by the toggles 34.

From the above it will be seen that the load carrying device of this invention includes load supporting members which are permanently fixed to the frame, but which are capable of a variety of adjustments so that they may receive and hold tightly loads such as bombs of several different sizes. Although the invention as shown applies to a trailer, it might be mounted on a truck or any other sort of vehicle.

I claim:

1. In combination, in a load holding assembly, a support, a plurality of racks, pivotally mounted on said support and including a central rack, and a plurality of end racks, each of said racks comprising a longitudinal shaft like member, on said support, and comprising load engaging parts, said central rack having sets of load engaging parts, positioned on its longitudinal member at an angle from each other, each of said end racks having a single set of load engaging parts.

2. In combination, in a load holding assembly, a support, a plurality of four racks, pivotally mounted on said support and including a plurality of central racks, and a plurality of end racks, each of said racks comprising a longitudinal shaft like member, on said support and comprising load engaging parts, said central racks having sets of load engaging parts, positioned on its longitudinal member at an angle from each other, each of said end racks having a single set of load engaging parts.

3. In combination, in a load holding assembly, a support, a plurality of four racks, pivotally mounted on said support and including two central racks, and a plurality of two end racks, each of said racks comprising a longitudinal shaft like member on said support, and comprising load engaging parts, said central racks having sets of load engaging parts, positioned on its longitudinal member at an angle from each other, each of said end racks having a single set of load engaging parts.

4. In combination, in a load holding assembly, a support, a plurality of racks, pivotally mounted on said support and including a central rack, and a plurrailty of end racks, each of said racks comprising a longitudinal shaft like member, pivoted on said support, and comprising load engaging parts, said central rack having sets of load engaging parts, positioned on its longitudinal member at an angle from each other, each of said end racks having a single set of load engaging parts.

5. In combination, in a load holding assembly, a support, a plurality of racks, pivotally mounted on said support and including a central rack, and a plurality of end racks, each of said racks comprising a longitudinal shaft like member, on said support, and comprising load engaging parts, said central rack having sets of load engaging parts, positioned on its longitudinal member at right angles from each other, each of said end racks having a single set of load engaging parts.

6. In combination, in a load holding assembly, a support, a plurality of racks, pivotally mounted on said support and including a central rack, and a plurality of end racks, each of said racks comprising a longitudinal shaft like member, on said support, and comprising load engaging parts, said central rack having sets of load engaging parts, positioned on its longitudinal member at right angles from each other, each of said end racks having a single set of load engaging parts and having stops positioned at right angles from said load engaging parts, each of said racks having attachment receiving parts adapted to receive load latching means.

7. In combination, in a load holding assembly, a support, a plurality of four racks, pivotally mounted on said support and including a plurality of two central racks, and a plurality of two end racks, each of said racks comprising a longitudinal shaft like member, pivoted on said support, and comprising load engaging parts, said central racks having two sets of load engaging parts, positioned on its longitudinal member at right angles from each other, each of said end racks having a single set of load engaging parts.

8. In combination, in a load holding assembly, a support, a plurality of four racks, pivotally mounted on said support and including a plurality of two central racks, and a plurality of two end racks, each of said racks comprising a longitudinal shaft like member, pivoted on said support, and comprising load engaging parts, said central racks having two sets of load engaging parts, positioned on its longitudinal member at right angles from each other, each of said end racks having a single set of load engaging parts and having stops positioned at right angles from said load engaging parts, each of said racks having attachment receiving parts adapted to receive load latching means.

LESTER W. WACHTER.